United States Patent
Matsushima

(10) Patent No.: US 10,266,084 B2
(45) Date of Patent: Apr. 23, 2019

(54) VEHICLE SEAT

(71) Applicant: TOYOTA BOSHOKU KABUSHIKI KAISHA, Aichi-ken (JP)

(72) Inventor: Iwao Matsushima, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 29 days.

(21) Appl. No.: 15/631,583

(22) Filed: Jun. 23, 2017

(65) Prior Publication Data

US 2017/0368971 A1 Dec. 28, 2017

(30) Foreign Application Priority Data

Jun. 28, 2016 (JP) ................................ 2016-127951

(51) Int. Cl.
  *B60N 2/58* (2006.01)
  *B60N 2/20* (2006.01)
  *B60N 2/64* (2006.01)
  *B60N 2/68* (2006.01)

(52) U.S. Cl.
  CPC ............. *B60N 2/5825* (2013.01); *B60N 2/20* (2013.01); *B60N 2/643* (2013.01); *B60N 2/646* (2013.01); *B60N 2/5816* (2013.01); *B60N 2/68* (2013.01)

(58) Field of Classification Search
  CPC ........ B60N 2/5825; B60N 2/20; B60N 2/643; B60N 2/646; B60N 2/5816; B60N 2/06
  See application file for complete search history.

(56) References Cited

U.S. PATENT DOCUMENTS

| 9,649,964 | B2 * | 5/2017 | Imajo | B60N 2/68 |
| 10,011,205 | B2 * | 7/2018 | Line | B60N 2/682 |
| 2014/0375028 | A1 | 12/2014 | Sahashi | |
| 2017/0368965 | A1 * | 12/2017 | Matsushima | B60N 2/68 |
| 2018/0037147 | A1 * | 2/2018 | Tanaka | B60N 2/682 |

FOREIGN PATENT DOCUMENTS

JP  2015-3578  1/2015

* cited by examiner

*Primary Examiner* — Philip F Gabler
(74) *Attorney, Agent, or Firm* — Greenblum & Bernstein, P.L.C.

(57) ABSTRACT

A vehicle seat including a seat back, the seat back including: a back frame serving as a framework; a top plate main seat pad that is a covered cushion member attached to the back frame and serving as a support structure at the center in a seat width direction; a top plate side seat pad that is a covered cushion member attached to the back frame and serving as support structures on both sides in the seat width direction; and a headrest, wherein the top plate main seat pad includes, at its upper portion, an annular portion having an opening portion in which the headrest is inserted and placed, and an open annular base member, which is harder than the top plate main seat pad and whose front surface portion is opened, is disposed on a surface of the annular portion at an inner side of the seat.

4 Claims, 11 Drawing Sheets

VEHICLE SEAT

CROSS-REFERENCE TO RELATED APPLICATIONS

This application claims priority from Japanese Patent Application No. 2016-127951 filed on Jun. 28, 2016, the entire contents of which are incorporated herein by reference.

TECHNICAL FIELD

The disclosure relates to a vehicle seat.

BACKGROUND

A vehicle seat of a design in which a headrest is disposed on an upper surface of a seat back has been known. In an automobile seat disclosed in JP-A-2015-3578, a top plate main part and a top plate side part of a seat back are formed in a continuous surface shape from an upper portion to a lower portion of the seat back. Further, a headrest is disposed on an upper surface portion of the top plate main part.

In the automobile seat disclosed in JP-A-2015-3578, the top plate main part and the top plate side part of the seat back are formed in a continuous surface shape from the upper portion to the lower portion of the seat back, and hence, it is unnecessary to place a member for shaping on a back side of an upper portion of the top plate main part. Thus, there is no need to worry about the deterioration in sitting comfort such as occurrence of discomfort according to the partial difference in cushion feeling due to the presence of the member for shaping. On the other hand, there is a case where the upper portion of the top plate main part is formed into an annular shape provided with an opening portion opened to the upper side from the design requirement. In this case, a headrest is placed at the opening portion provided in the upper portion of the top plate main part, and hence, a design in which the top plate main part is jacketed to the seat back is achieved. At this time, it is desirable to place, on the inner side, a member such as a resin base member which is harder than a cushion pad that is a cushion member for the purpose of securely shaping the form of the annular shaped part. Here, since the resin base member or the like is hard, the cushion feeling of the cushion pad becomes partially different. Therefore, there is a possibility that the deterioration of the sitting comfort due to the discontinuity of the cushion feeling is caused.

SUMMARY

The disclosure provides a vehicle seat including a seat back of a design where an upper portion of a top plate main part is formed into an annular shape to provide an opening portion and a headrest is placed in the opening portion, and in which both the sitting comfort and the external appearance are satisfied.

According to an aspect of the disclosure, there is provided a vehicle seat including a seat back, the seat back including: a back frame serving as a framework; a top plate main seat pad that is a covered cushion member attached to the back frame and serving as a support structure at the center in a seat width direction; a top plate side seat pad that is a covered cushion member attached to the back frame and serving as support structures on both sides in the seat width direction; and a headrest, wherein the top plate main seat pad includes, at its upper portion, an annular portion having an opening portion in which the headrest is inserted and placed, and an open annular base member, which is harder than the top plate main seat pad and whose front surface portion is opened, is disposed on a surface of the annular portion at an inner side of the seat.

Accordingly, the open annular base member, which is harder than the top plate main seat pad and whose front surface portion is opened, is disposed on the annular portion of the top plate main seat pad. With this configuration, the annular portion including, particularly, a shoulder portion which needs to be shaped, can be shaped, so that the external appearance can be improved. Further, since the base member does not affect the front surface portion, the deterioration of the sitting comfort due to the discontinuity of the cushion feeling can be suppressed.

BRIEF DESCRIPTION OF DRAWINGS

In FIG. 1, a headrest is omitted.

In FIG. 2, a back cover is omitted.

In FIG. 3, the back cover is omitted.

DETAILED DESCRIPTION

FIGS. 1 to 11 show an embodiment of the disclosure. This embodiment is an example in which the disclosure is applied to an automobile seat. In each drawing, respective directions of an automobile and an automobile seat when the automobile seat is attached to the automobile are indicated by arrows. In the following, the descriptions relating to the directions will be made on the basis of these directions. An automobile seat 1 of the present embodiment includes a seat cushion 10 serving as a seating part, a seat back 20 serving as a backrest, and a headrest (not shown) supporting a head part.

Figure 1:
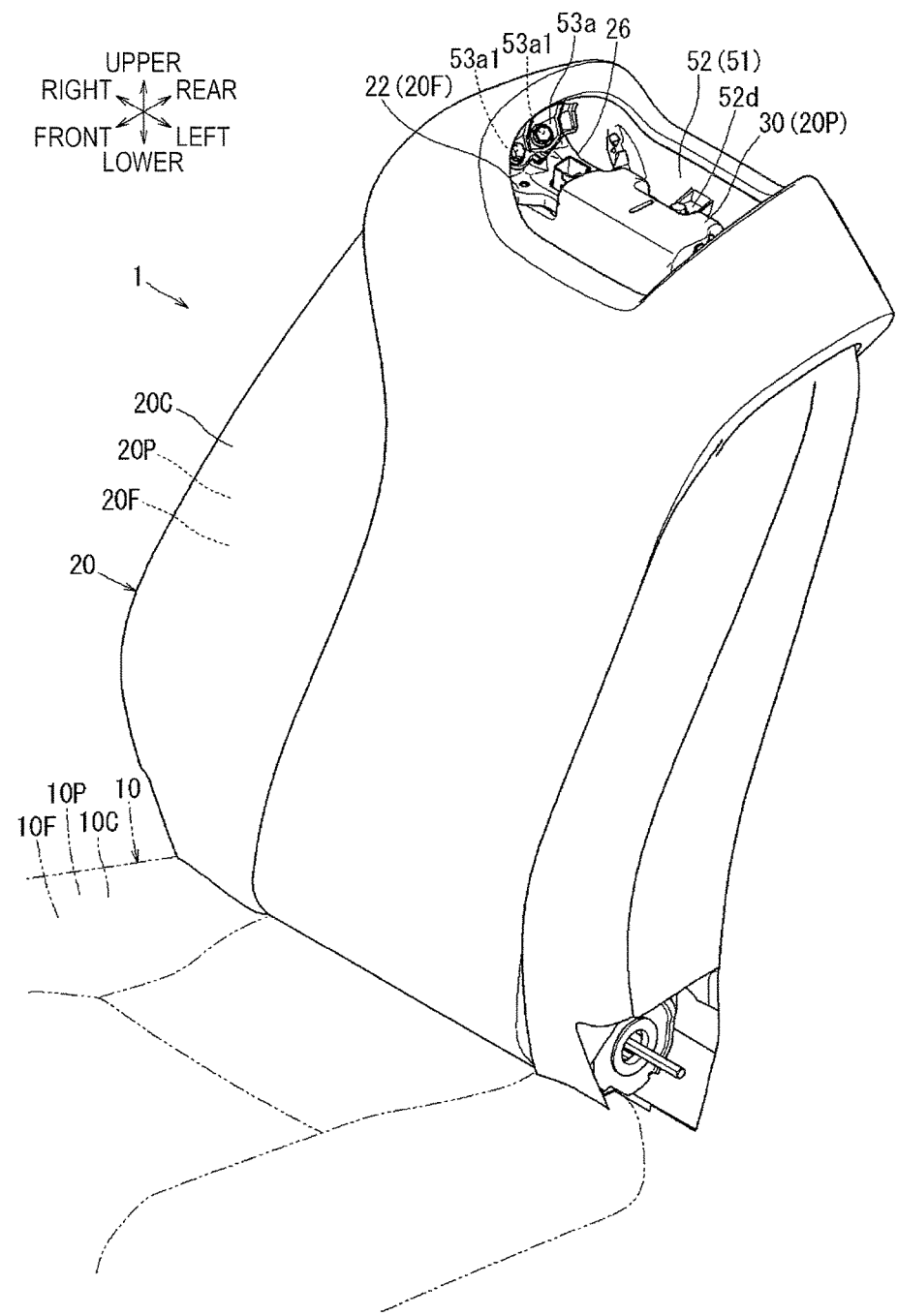
FIG. 1 is a perspective view of an automobile seat according to an embodiment of the disclosure, as seen obliquely from the front.

As shown in FIG. 1, the seat cushion 10 includes a cushion frame 10F that forms a framework, a cushion pad 10P that is a cushion member placed on the cushion frame 10F, and a cushion cover 10C that is skin member covering the cushion pad 10P from above. Further, the seat back 20 includes a back frame 20F that forms a framework, a back pad 20P that is a cushion member placed on the back frame 20F, and a back cover 20C that is a skin member covering the back pad 20P from above. Since the seat cushion 10 and a headrest 70 are known structures, the explanation thereof will be omitted, and the seat back 20 will be described. Here, the automobile seat 1 corresponds to the "vehicle seat" in the claims.

Figure 2:
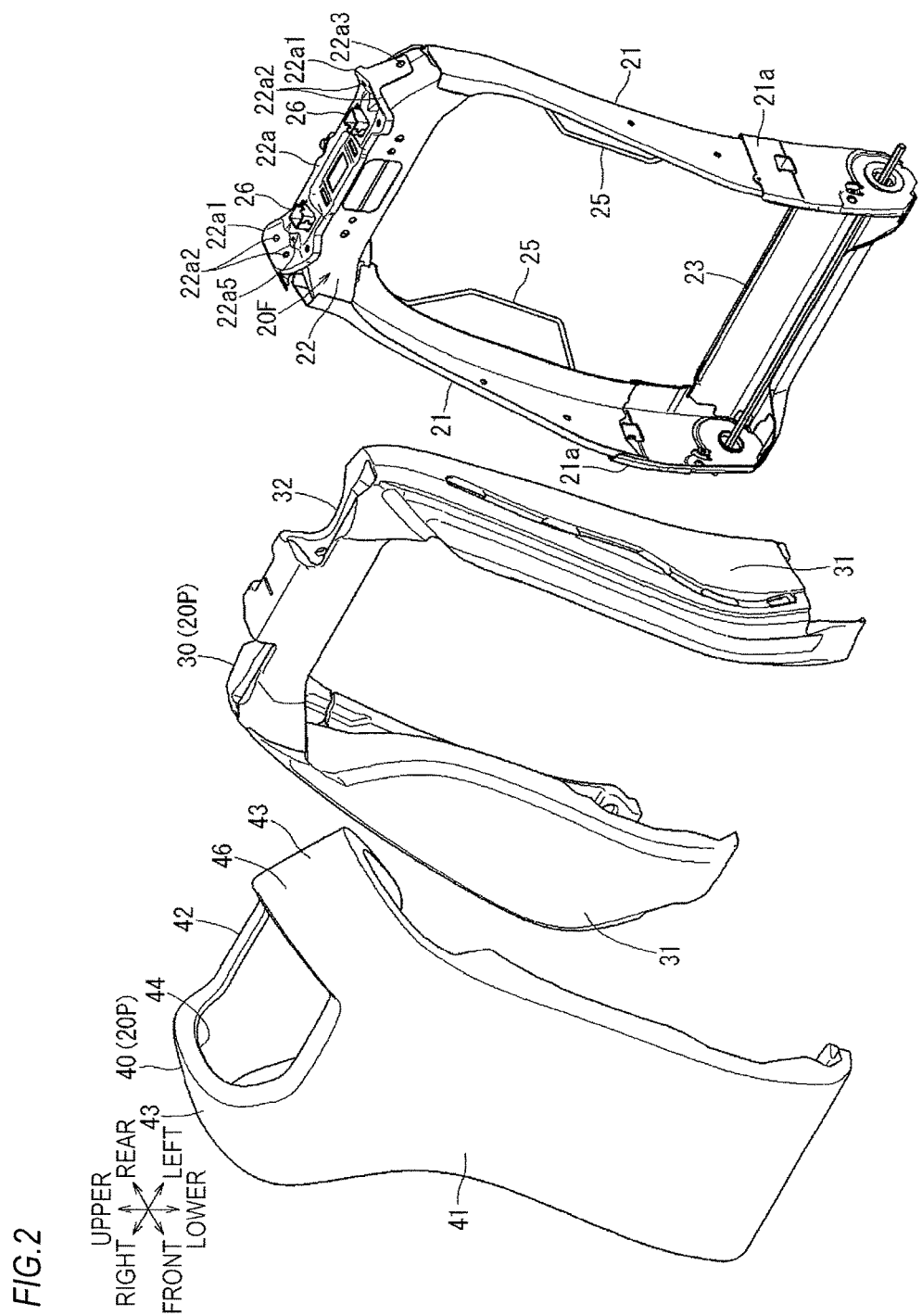
FIG. 2 is an exploded perspective view of a seat back of the automobile seat according to the above embodiment, as seen obliquely from the front.
Figure 3:
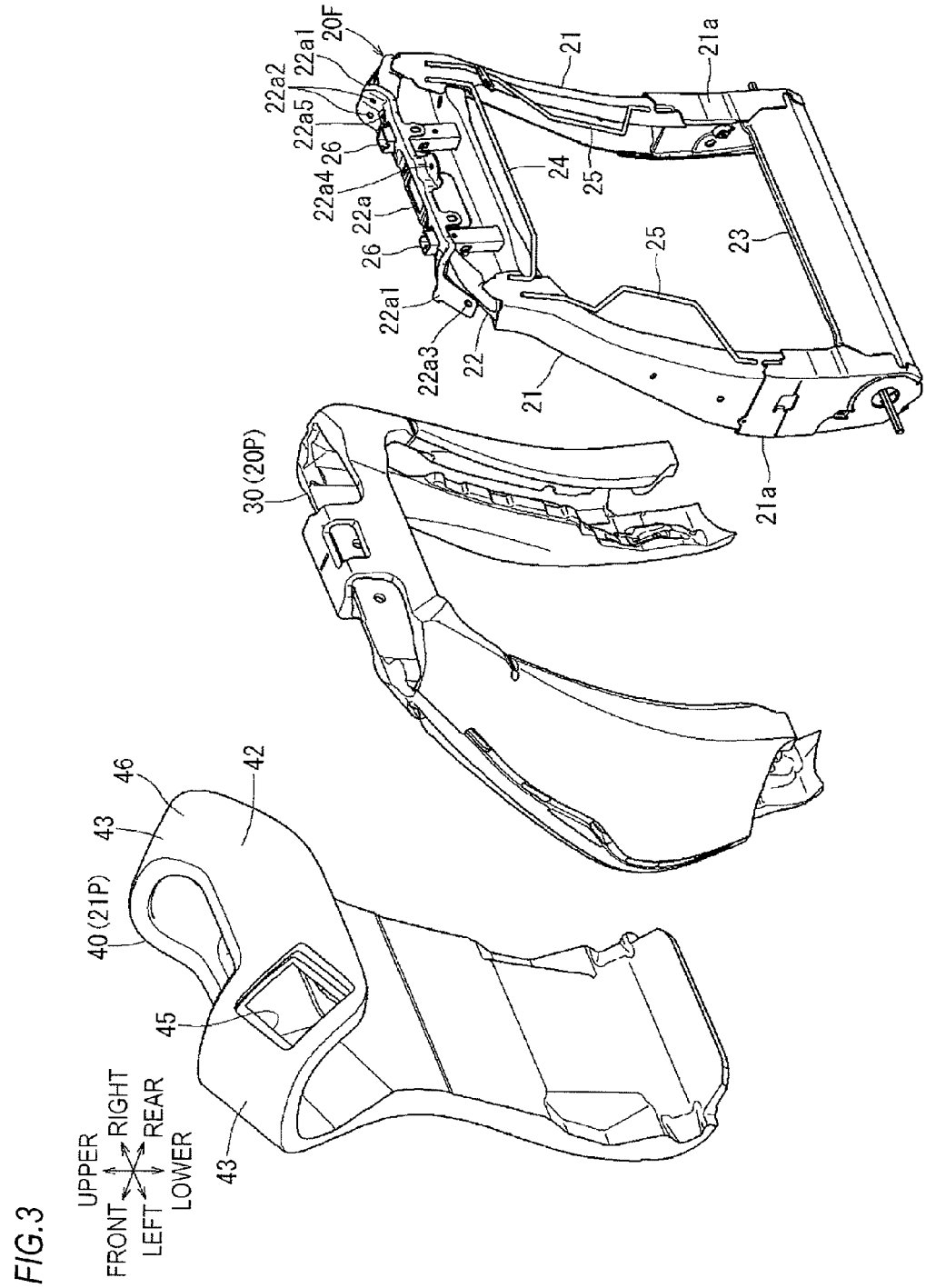
FIG. 3 is an exploded perspective view of the seat back of the automobile seat according to the above embodiment, as seen obliquely from the rear.

As shown in FIGS. 2 and 3, the back frame 20F of the seat back 20 is made of iron and includes a pair of left and right side frames 21 extending in an upper and lower direction, an upper frame 22 connecting upper end portions of the respective side frames 21 to each other, and a lower panel 23 connecting lower end portions of the respective side frames 21 to each other. The back frame 20F is formed in a substantially rectangular shape in a front view. Each of the side frames 21 is a substantially U-shaped press molded member whose cross section is opened in a seat inside direction. A reinforcing member 21a is attached to a lower end side of each side frame 21. Between rear surfaces of the upper end portions of the side frames 21, a locking wire 24 for attaching a base member 50 of a main back pad 40 (to be described later) to the back frame 20F is arranged to extend in a left and right direction. The locking wire 24 has a circular cross section. Further, between the lower end portion and the upper end portion of each side frame 21, a cover locking wire 25 for locking an end portion of the back cover 20C is arranged to extend in the upper and lower direction. The cover locking wire 25 has a circular cross section. The upper frame 22 is a substantially U-shaped press molded member whose cross section is opened in a seat rearward direction. A base member mounting member 22a for attaching the base member 50 of the main back pad 40 to the back frame 20F is attached to an upper surface of an upper surface portion of the upper frame 22. The base member mounting member 22a is a press molded member. A mountain-like portion 22a1 where a ridge line extend in a front and rear direction is formed on both left and right end sides of the base member mounting member 22a, respectively. On a seat inner side slope of each mountain-like portion 22a1, two bolt holes 22a2 are provided side by side in the front and rear direction. Further, a clip hole 22a3 is provided on an end side of a seat outer side slope of each mountain-like portion 22a1. A bolt hole 22a4 penetrating in the upper and lower direction is provided at the center portion in the left and right direction on the rear side of the base member mounting member 22a. Furthermore, a positioning pin hole 22a5 is provided on the seat inner side of the bolt holes 22a2. Between the upper surface portion of the upper frame 22 and the base member mounting member 22a, and the lower surface portion of the upper frame 22, a pair of holders 26 extending therethrough in the upper and lower direction is arranged at bilateral-symmetrical positions. Each holder 26 is a rectangular tubular member, and a headrest support is inserted and supported in an inner tubular portion of the holder. The lower panel 23 is a press molded member having a substantially L-shaped cross section. Besides these parts, a recliner for adjusting an inclination angle with respect to the cushion frame 10F and a wire for supporting the back pad 20P and the like are attached to the back frame 20F. However, since these members are not directly related to the disclosure, illustration and explanation thereof will be omitted.

As shown in FIGS. 2 and 3, the back pad 20P includes a side back pad 30 for mainly supporting a body side of a seated occupant and a main back pad 40 for mainly supporting a body back of a seated occupant. The side back pad 30 is made of foamed urethane resin and is configured in such a way that upper end portions of a pair of left and right bank parts 31 are connected by an upper part 32. The side back pad 30 has a substantially inverted U shape in a front view. Each bank part 31 is attached to the back frame 20F so as to cover each side frame 21. The main back pad 40 is made of foamed urethane resin and is formed in an apron shape. The main back pad 40 includes a front surface portion 41, a rear surface portion 42, and a pair of left and right connecting portions 43 connecting the front surface portion 41 and the rear surface portion 42. The front surface portion 41 is shaped to be fitted into a space provided between the pair of left and right bank parts of the side back pad 30. The rear surface portion 42 is shaped to cover an upper rear surface portion of the back frame 20F. The pair of left and right connecting portions 43 connects an upper end portion of the front surface portion 41 and an upper end portion of the rear surface portion 42 to each other on the left and right sides, and thus, an opening portion 44 in which a headrest is disposed is formed at the center portion in the left and right direction. An upper end portion of the front surface portion 41 surrounding the opening portion 44, the rear surface portion 42 and the pair of left and right connecting portions 43 form an annular portion 46 which is annular as viewed from above. A through hole corresponding to an opening 52a of the base member 50 (to be described later) is formed at a left end portion of the rear surface portion 42. Here, the main back pad 40 and the side back pad 30 correspond to the "top plate main seat pad" and the "top plate side seat pad" in the claims, respectively.

Figure 4:
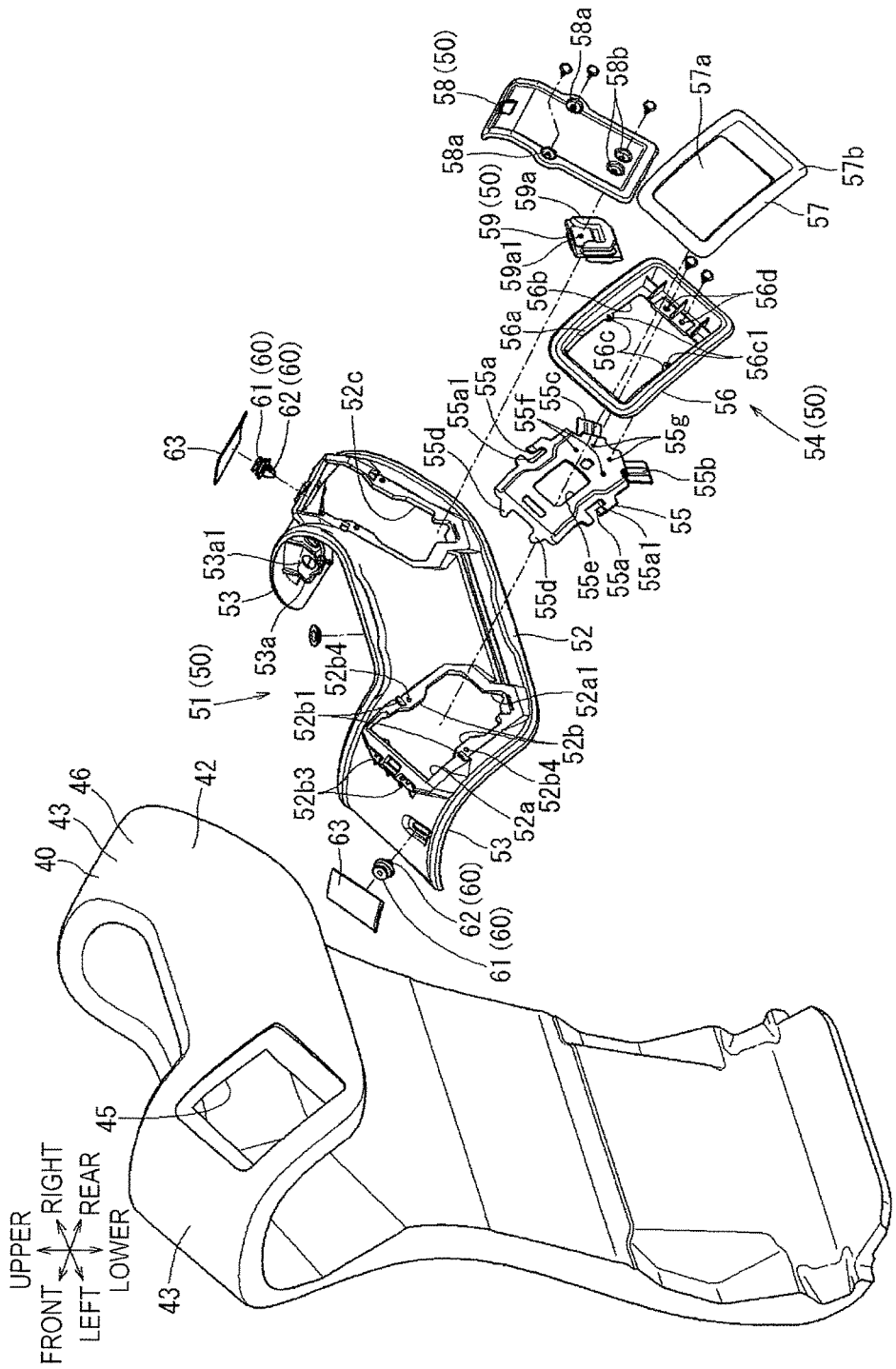
FIG. 4 is an exploded perspective view of a main back pad of the seat back according to the above embodiment, as seen obliquely from the rear.

As shown in FIG. 4, the base member 50, which is a part made of resin, is disposed from the front surface side of the rear surface portion 42 to the lower surface side of the connecting portions 43 of the main back pad 40. The base member 50 includes a main body part 51 formed by injection molding of polypropylene resin, a lever device part 54 attached to the left side of the main body part 51, and a lid member 58 and a locking member 59 attached to the right side of main body part 51. Here, the base member 50 corresponds to the "base member" in the claims.

Figure 5:
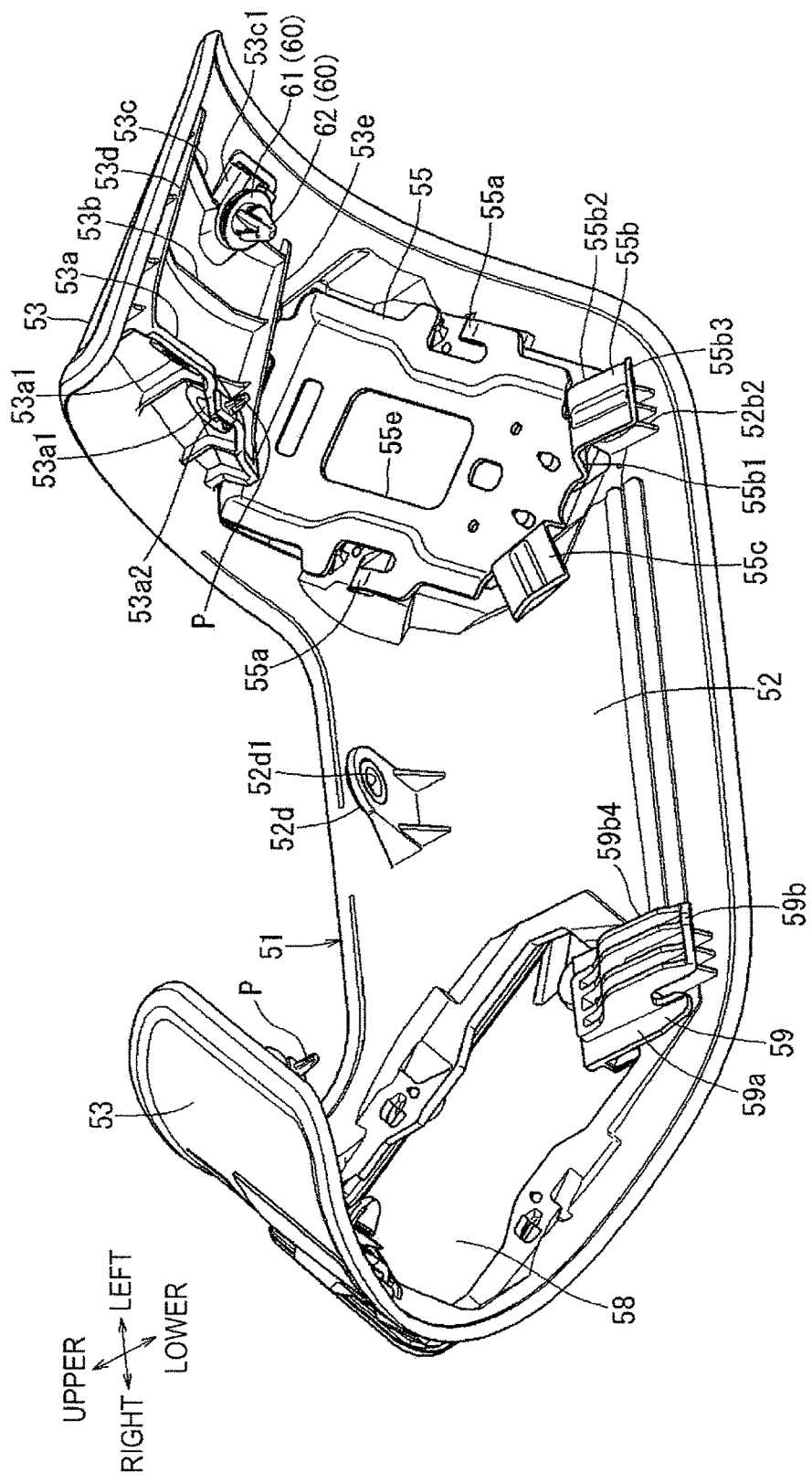
FIG. 5 is a perspective view of a base member of the main back pad according to the above embodiment, as seen from the right lower side.
Figure 6:
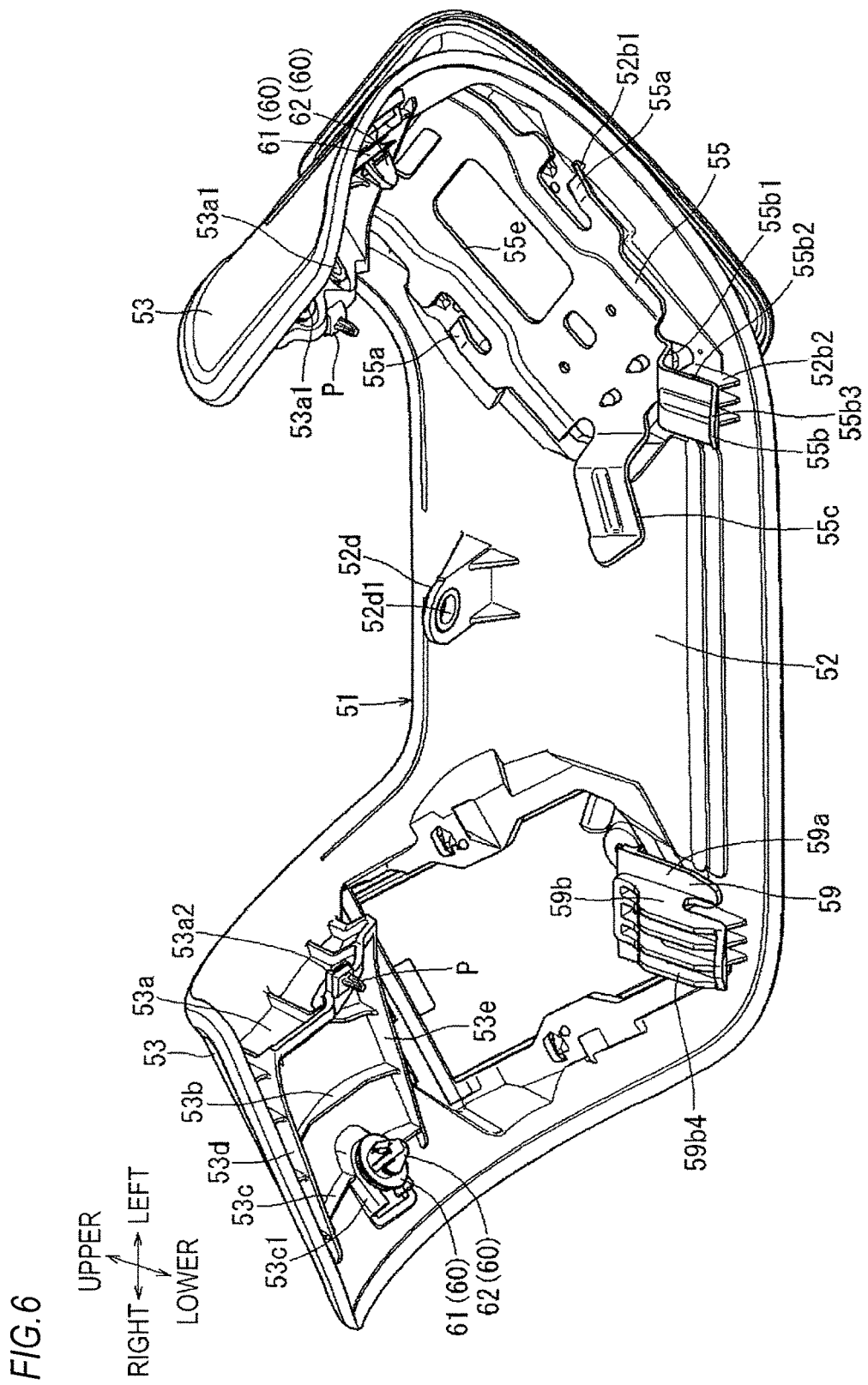
FIG. 6 is a perspective view of the base member of the main back pad according to the above embodiment, as seen from the left lower side.

As shown in FIGS. 4 to 6, the main body part 51 of the base member 50 includes a rear wall portion 52 that abuts against the front surface side of the rear surface portion 42 of the main back pad 40, and a pair of upper wall portions 53 that respectively abuts against the lower surface sides of the left and right connecting portions 43 of the main back pad 40. Front end portions of the left and right upper wall portions 53 are not connected to each other, thereby forming an open annular shape as viewed from above. The opening 52a having a substantially rectangular shape in a rear view is formed from a left end portion of the rear wall portion 52 to a lower end portion of the left connecting portion 43. Specifically, the opening 52a is arranged such that the long side direction of the rectangular shape is inclined to the left side by about 45 degrees with respect to the center plane in the left and right direction of the main back pad 40. The opening 52a has a pair of protrusions 52b protruding to the inner side of the opening 52a substantially at the center portions of the long sides of the rectangular shape. A locking hole 52b1 for inserting and locking a middle claw portion 55a of a base plate 55 of the lever device part 54 (to be described later) is provided on an upper side of a root portion of each protrusion 52b. A screw hole 52b4 is provided slightly below the locking hole 52b1. A notch 52a1 is provided downward at a left lower corner portion of the opening 52a. Three standing wall portions 52b2 are formed on the front surface of the rear wall portion 52 on the lower side of the notch 52a1 and extend in parallel to each other in the upper and lower direction. A top surface portion 52b21 (see FIG. 9) of each standing wall portion 52b2 faces a left locking part 55b of the base plate 55 of the lever device part 54 (to be described later) to constitute one of the locking portions. The notch 52a1 and the left locking portion 55b have substantially the same width in the left and right direction. Furthermore, a pair of locking holes 52b3 for inserting and locking a pair of upper claw portions 55d of the base plate 55 of the lever device part 54 (to be described later) is provided on an upper side of an upper short side of the opening 52a. An opening 52c having a substantially rectangular shape in a rear view is formed from the right end portion of the rear wall portion 52 to the lower end portion of the right connecting portion 43. Since the structure of the opening 52c and the rear wall portion 52 at the peripheral edge thereof is plane-symmetrical with that of the opening 52a and the rear wall portion 52 at the peripheral edge thereof with respect to the center plane in the left and right direction of the main body part 51, the explanation thereof will be omitted. Thus, the lever device part 54, and the lid member 58 and the locking member 59 are selectively attached to the opening 52a and the opening 52c of the main body part 51, respectively. A bolt fastening piece 52d is erected toward the front at the upper side of the center portion in the left and right direction on the front side of the rear wall portion 52. The bolt fastening piece 52d is provided with a bolt hole 52d1 through which a bolt for bolt-fastening to the upper frame 22 is passed. The bolt hole 52d1 is penetrated in the upper and lower direction.

As shown in FIGS. 4 to 6 and 10, three ribs extending in the front and rear direction are formed substantially parallel to each other on the lower surface side of the upper wall portion 53 of the main body part 51. These three ribs include a rib 53a, a rib 53b and a rib 53c from the inside toward the outside of the seat. Front end portions of the rib 53a, the rib 53b and the rib 53c are connected to each other by a rib 53d extending in the left and right direction. Rear end portions of the rib 53a, the rib 53b and the rib 53c are connected to each other by a rib 53e extending in the left and right direction. The rib 53a extends to be bent toward the center of the main body part 51 in the left and right direction from the middle. Two bolt holes 53a1 are provided side by side in the front and rear direction on the bent surface portion. Furthermore, a pin locking portion 53a2 for attaching a positioning pin P is formed at a lower end portion of the rib 53a. A clip seat 53c for attaching a clip 60 is provided at the center portion of the rib 53c in the front and rear direction. The clip 60 is a known clip made of resin and formed by a pedestal 61 and a locking leg 62 formed integrally from the pedestal 61. The locking leg 62 can be inserted and locked in the clip hole 22a3 provided in the base member mounting member 22a of the upper frame 22. The clip seat 53c1 is provided with an attaching hole to which the pedestal 61 of the clip 60 can be attached. After the clip 60 is attached to the clip seat 53c1, a lid member 63 for covering the depression caused by the clip seat 53c1 to smooth the surface is attached to the upper surface of the upper wall portion 53 on the side opposite to the clip seat 53c1.

Figure 7:
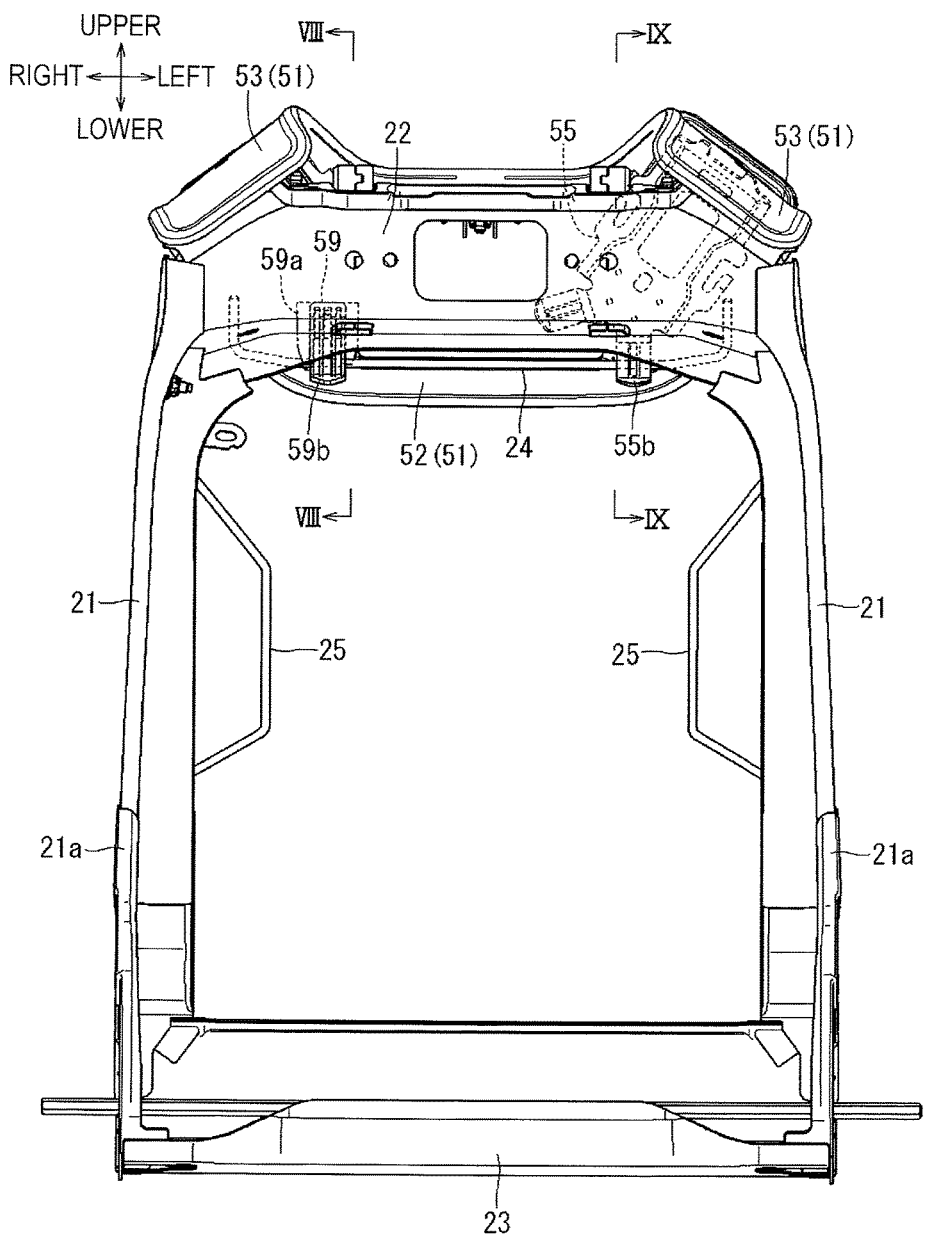
FIG. 7 is a front view showing a state in which the base member of the above embodiment is attached to a back frame.
Figure 8:
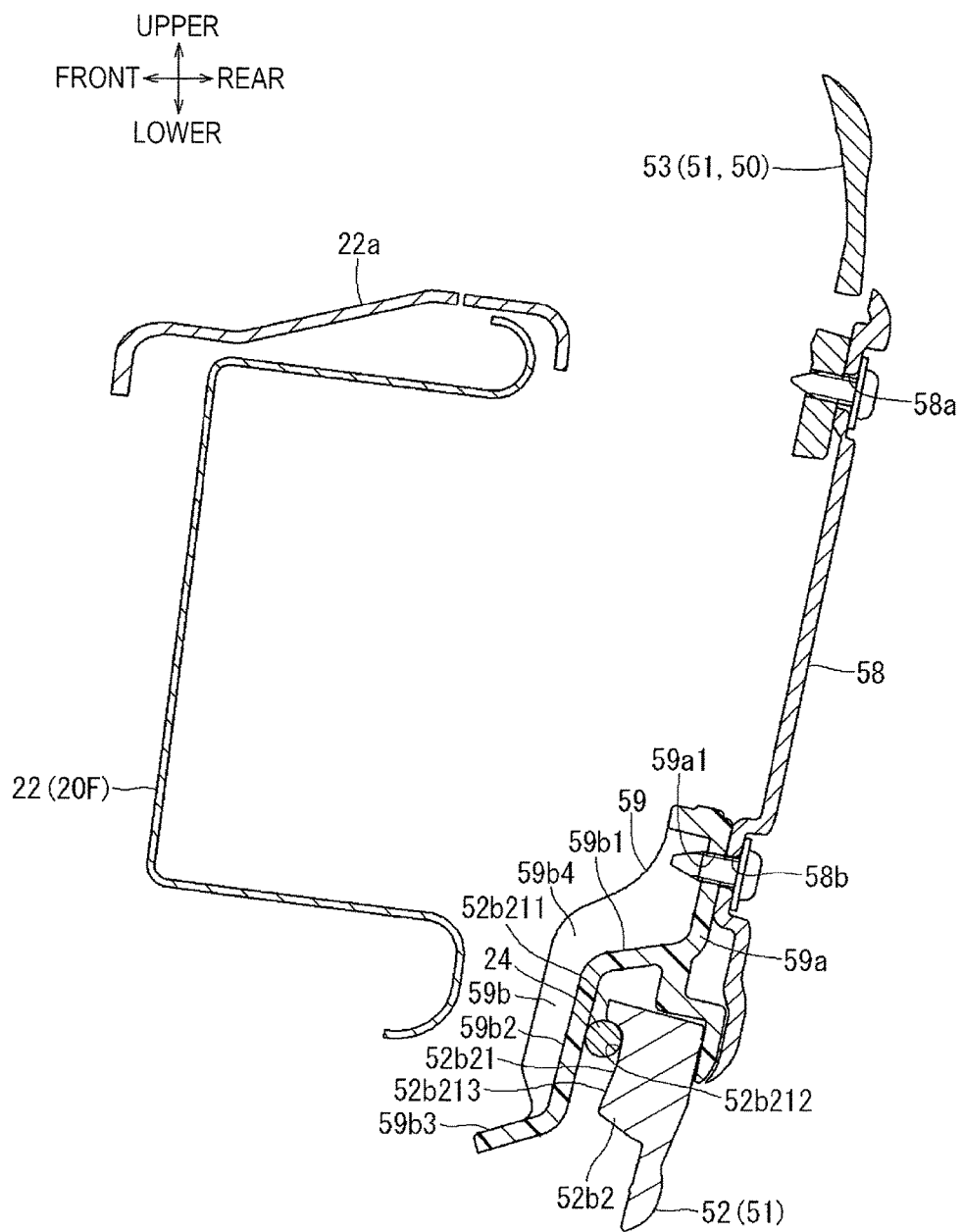
FIG. 8 is a sectional view taken along the line VIII-VIII shown in FIG. 7.
Figure 9:
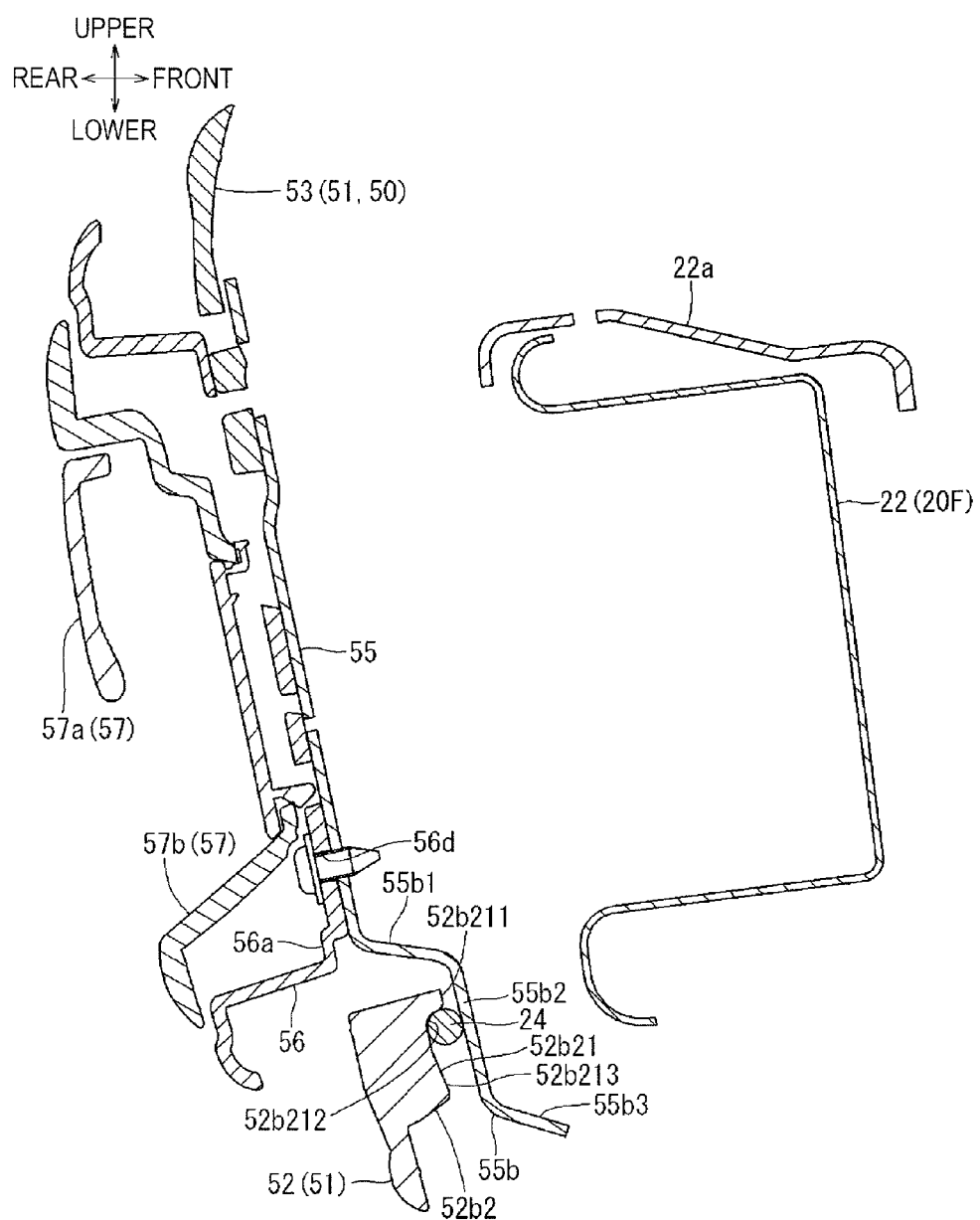
FIG. 9 is a sectional view taken along the line IX-IX shown in FIG. 7.

As shown in FIGS. 4 to 10, the lever device part 54 includes the base plate 55 that is a press molded member of a steel plate, a bezel 56 made of resin, and a lever device 57. The base plate 55 has a substantially rectangular shape in a rear view. A middle claw portion 55a is respectively formed substantially at the center portions of the long sides of the rectangular shape and extends upward in parallel with the long side. A pair of upper claw portions 55d is formed at an upper side of the upper short side. A screw hole 55a1 is respectively formed between the middle claw portions 55a and the main body of the base plate 55. Further, a left locking portion 55b having a substantially rectangular shape in a rear view is formed at the left lower corner of the base plate 55, and a right locking portion 55c having a substantially rectangular shape in a rear view is formed at the right lower corner of the base plate 55. As shown in FIG. 9, the left locking portion 55b has a standing wall portion 55b1 rising forward at an obtuse angle with respect to the main body of the base plate 55 and a pressing wall portion 55b2 extending downward from a leading end portion of the standing wall portion 55b1 in parallel with the main body of the base plate 55. Furthermore, the left locking portion 55b has a guide wall portion 55b3 extending forward from a leading end portion of the pressing wall portion 55b2 in parallel with the standing wall portion 55b1. The pressing wall portion 55b2 is a portion that holds the locking wire 24 fitted between the standing wall portion 52b2 of the main body part 51 and the pressing wall portion 55b2 when the base plate 55 is attached to the main body part 51 of the base member 50. The top surface portion 52b21 of the standing wall portion 52b2 has a first portion 52b211 which is located at an upper end and has the smallest gap with respect to the pressing wall portion 55b2, a second portion 52b212 which is smoothly connected from the first portion 52b211 and has the largest gap with respect to the pressing wall portion 55b2, and a third portion 52b213 which is smoothly connected from the second portion 52b212 and has medium gap with respect to the pressing wall portion 55b2. The third portion 52b213 is located at a lower end of the top surface portion 52b21 of the standing wall portion 52b2. That is, when the pressing wall portion 55b2 holds the locking wire 24 fitted between the standing wall portion 52b2 and the pressing wall portion 55b2, the locking wire 24 is prevented from going upward beyond the second portion 52b212. Further, as the position of the locking wire 24 is displaced from the second portion 52b212 toward the third portion 52b213, a pressing force from the pressing wall portion 55b2 and the standing wall portion 52b2 against the locking wire 24 is increased. Meanwhile, even when the locking wire 24 is positioned at the second portion 52b212, the pressing force from the pressing wall portion 55b2 and the standing wall portion 52b2 against the locking wire 24 does not become zero. The guide wall portion 55b3 is a portion that functions to guide the locking wire 24 between the pressing wall portion 55b2 and the standing wall portion 52b2. The right locking portion 55c is plane-symmetrical with the left locking portion 55b with respect to a plane perpendicular to the base plate 55 and passing through the bisection point of the short sides thereof. This configuration allows the right locking portion 55c to perform the same function in cooperation with the right standing wall portion 52b2 when the base plate 55 is attached to the right opening 52c of the main body part 51. Furthermore, an opening portion 55e through which a wire connection portion of the lever 57a of the lever device 57 with an operating wire (not shown) disposed inside the seat back 20 passes is provided substantially at the center portion of the base plate 55. At symmetrical positions with respect to the perpendicular bisector of the short sides on the lower end side of the base plate 55, a pair of screw holes 55f is provided at the upper side and a pair of screw holes 55g is provided at the lower side.

Figure 10:
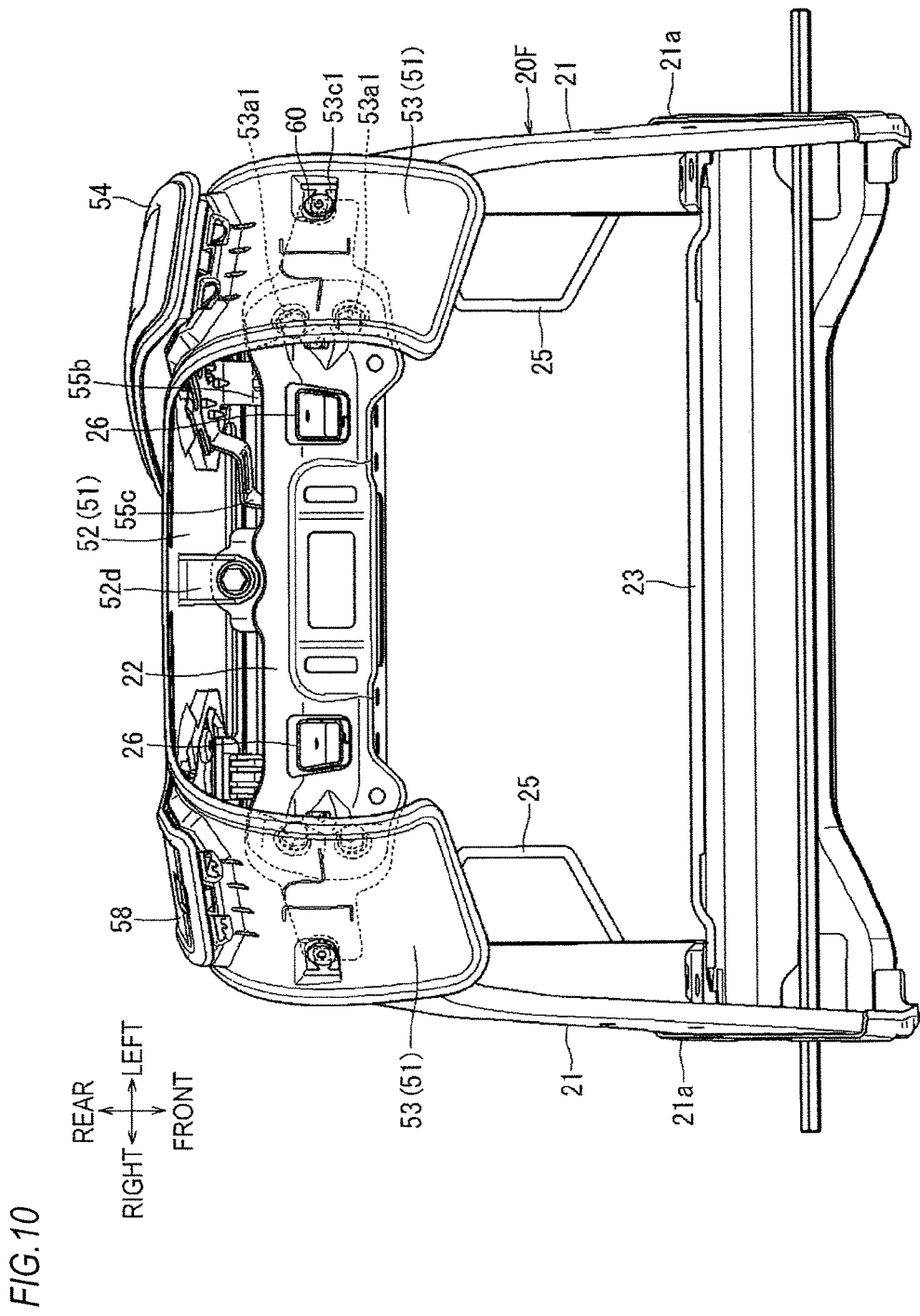
FIG. 10 is a plan view showing a state in which the base member of the above embodiment is attached to the back frame.

As shown in FIGS. 4, 9 and 10, the bezel 56 has a rectangular shape in a rear view, and includes a recessed portion 56a at the center. The recessed portion 56a is provided with a rectangular opening portion 56b. A protrusion 56c protruding inward is respectively provided on the long side portions of the peripheral edge of the opening portion 56b. A screw hole 56c1 is formed in each protrusion 56c. In the lower short side of the peripheral edge of the opening portion 56b, a pair of screw holes 56d is provided at symmetrical positions with respect to the perpendicular bisector of the short sides. The lever device 57 includes the lever 57a and the case member 57b. The lever 57a is pivotally supported to be pivotable in the upper and lower direction with respect to the case member 57b. As the lever 57a is pivoted with respect to the case member 57b, an operating wire (not shown) disposed inside the seat back 20 can be pulled to operate a lock member (not shown) and the like. Here, the lever 57a corresponds to the "operating lever" in the claims.

As shown in FIGS. 4 to 8, the lid member 58 has a substantially rectangular shape in a rear view. A pair of screw holes 58a is provided in the vicinity of both ends in the center of the long side portions of the lid member 58, and a pair of screw holes 58b is provided at symmetrical positions with respect to the perpendicular bisector of the short sides in the vicinity of the lower short side portion of the lid member 58. The locking member 59 is an integrally molded member made of resin and has a base portion 59a and a locking wall portion 59b. When fitted to the notch 52a1 of the right opening 52c from above, the base portion 59a is adapted to clamp the peripheral edge portion of the notch 52a1 from the front and rear sides. A screw hole 59a1 through which a screw for screw-fixing to the right screw hole 58b of the lid member 58 passes is provided on the upper end side of the base portion 59a. As shown in FIG. 8, the locking wall portion 59b has a standing wall portion 59b1 rising forward at an obtuse angle with respect to a screw-fastening surface portion of the base portion 59a with the lid member 58. Further, the locking wall portion 59b has a pressing wall portion 59b2 extending downward from a leading end portion of the standing wall portion 59b1 in parallel with the screw-fastening surface portion of the base portion 59a with the lid member 58. Furthermore, the locking wall portion 59b has a guide wall portion 59b3 extending forward from a leading end portion of the pressing wall portion 59b2 in parallel with the standing wall portion 59b1. Four ribs 59b4 for reinforcement are erected in parallel to each other on the front surface portion side from the base portion 59a to the pressing wall portion 59b2 via the standing wall portion 59b1. The standing wall portion 59b1, the pressing wall portion 59b2 and the guide wall portion 59b3 of the locking wall portion 59b respectively correspond to the standing wall portion 55b1, the pressing wall portion 55b2 and the guide wall portion 55b3 of the left locking portion 55b of the base plate 55, and the shape of the contact surface thereof with the locking wire 24 is similarly formed.

An assembling procedure of the seat back 20 will be described with reference to FIGS. 1 to 11. The upper claw portions 55d of the base plate 55 are locked to the locking holes 52b3 of the man body portion 51, and the middle claw portions 55a of the base plate 55 are locked to the locking holes 52b1 of the main body part 51. Further, the base portion 59a of the locking member 59 is fitted to the right notch 52a1 of the main body part 51. In this state, the lid member 58 is placed to cover the opening 52c of the main body part 51. The screw holes 58a are aligned with the screw holes 52b4, and then, the screw fixing is performed. The right screw hole 58b is aligned with the screw hole 59a1, and then, the screw fixing is performed. Furthermore, the lid member 63 is fixed to the upper surface of the main body part 51 by adhesion or the like in a state where the clip 60 is attached to the clip seat 53c1 of the main body part 51. In addition, the positioning pin P is attached to the pin locking portion 53a2. The base member 50 on which the base plate 55, the lid member 58 and the locking member 59 are attached is attached to the front surface side of the rear surface portion 42 of the main back pad 40 by adhesion or the like. At this time, the base plate 55 of the base member 50 is exposed from the through hole 45 of the main back pad 40. The main back pad 40 in this state is covered with the back cover 20C, so that a terminal portion is processed. Then, the through hole 45 is drilled. Subsequently, the bezel 56 is placed to cover the base plate 55 of the base member 50, and the screw holes 55g are aligned with the screw holes 56d, and then, the screw fastening is performed. Further, the screw holes 56c1, the screw holes 55a1 and the screw holes 52b4 are aligned, and then, the screw fastening is performed. In this way, the peripheral edge portion of the through hole 45 is in a state in which a terminal of the back cover 20C is covered by the bezel 56. In parallel, a terminal portion is processed in such a way that the side back pad 30 is attached to the back frame 20F and the back cover 20C is put thereon from above. Left and right terminal portions of the back cover 20C are locked to the cover locking wire 25.

As shown in FIGS. 7 to 9, the main back pad 40 is pressed from above in a state where the guide wall portion 55b3 of the left locking portion 55b of the base plate 55 and the guide wall portion 59b3 of the locking member 59 are in contact with the locking wire 24 of the back frame 20F. At this time, the positioning pin P is inserted into the positioning pin hole 22a5 of the base member mounting member 22a and is pressed down while being positioned. Then, the space between the region from the third portion 52b213 to the second portion 52b212 of the left standing wall portion 52b2 and the pressing wall portion 55b2 of the left locking portion 55b of the base plate 55 is pressed and widened, so that the locking wire 24 is fitted thereinto. Then, the fitting of the locking wire 24 is completed in a state where the locking wire 24 is in contact with the connection region between the second portion 52b212 and the first portion 52b211. At the same time, the space between the region from the third portion 52b213 to the second portion 52b212 of the right standing wall portion 52b2 and the pressing wall portion 59b2 of the locking member 59 is pressed and widened, so that the locking wire 24 is fitted thereinto. Then, the fitting of the locking wire 24 is completed in a state where the locking wire 24 is in contact with the connection region between the second portion 52b212 and the first portion 52b211. At this time, a gap between the third portion 52b213 and the pressing wall portion 55b2 is narrower than a gap between the second portion 52b212 and the pressing wall portion 55b2, and a gap between the third portion 52b213 and the pressing wall portion 59b2 is narrower than a gap between the second portion 52b212 and the pressing wall portion 59b2. Thus, when fitting the base member 50 to the locking wire 24, the sliding resistance is high at the beginning and is gradually lowered as the base member 50 is fitted to the locking wire 24. Then, in the state where the attachment of the main back pad 40 to the back frame 20F is completed, the locking wire 24 is pressed between the standing wall portion 52b2 and the pressing wall portion 55b2 and between the standing wall portion 52b2 and the pressing wall portion 59b2, so that the rattling in the front and rear direction does not occur. Further, when the main back pad 40 tries to move upward with respect to the locking wire 24 from the attachment state, that is, when the main back pad 40 tries to move in a direction away from the locking wire 24, the pressing force against the locking wire 24 generated between the standing wall portion 52b2 and the pressing wall portion 55b2 and between the standing wall portion 52b2 and the pressing wall portion 59b2 is increased. Thus, the sliding resistance is increased, thereby making it difficult to move. That is, the rattling in the upper and lower direction is suppressed.

Figure 11:
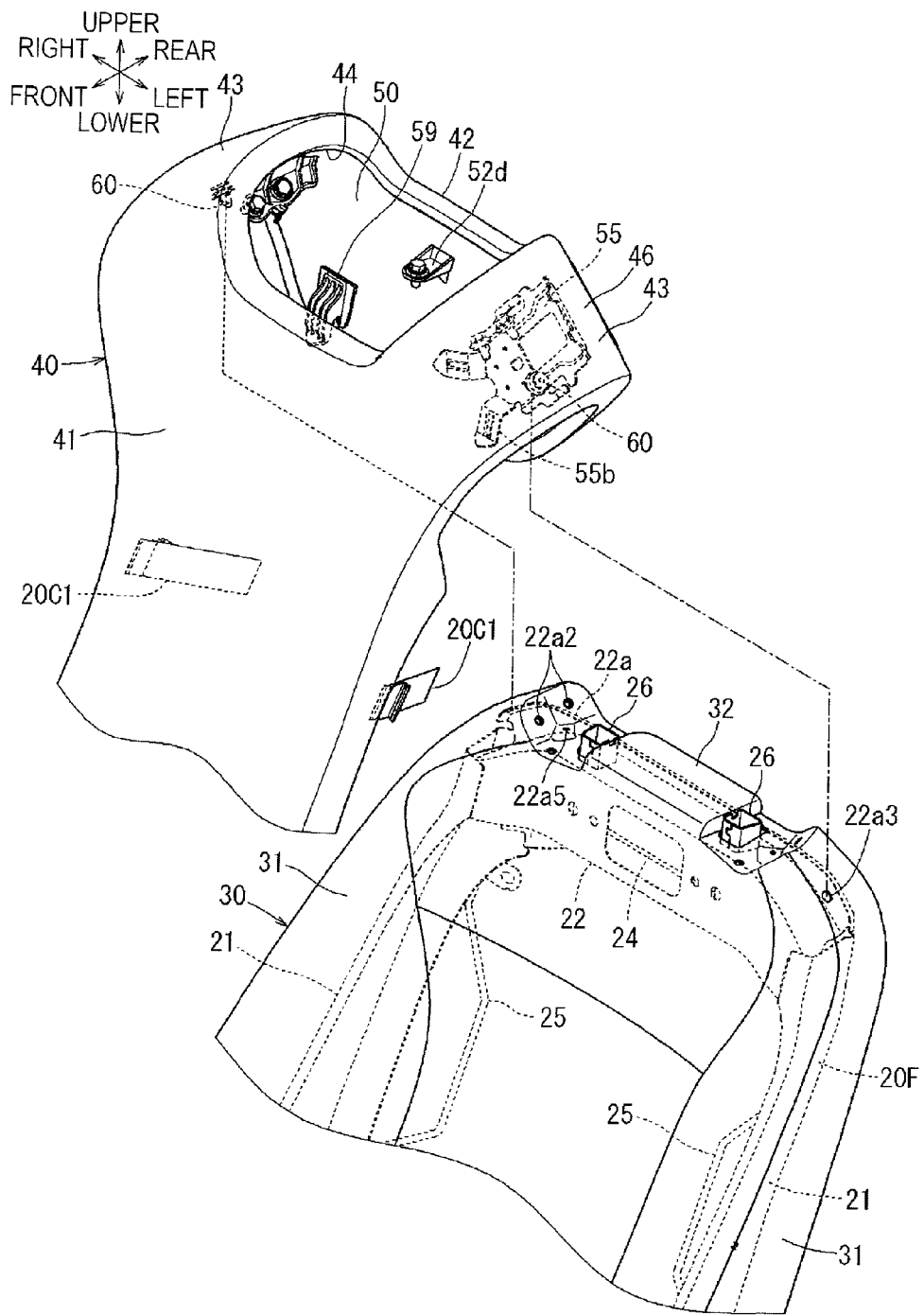
FIG. 11 is a view for explaining an assembling procedure of the seat back of the automobile seat according to the above embodiment.

As shown in FIGS. 1, 10 and 11, in the state where the main back pad 40 is attached to the locking wire 24 from above the back frame 20F to which the side back pad 30 is attached, the locking leg 62 of the clip 60 attached to the base member 50 is fitted and fixed to the clip hole 22a3 of the base member mounting member 22a. In this state, the bolt holes 53a1 of the base member 50 and the bolt holes 22a2 of the base member mounting member 22a are aligned, and these are fastened and fixed by bolts and nuts. Meanwhile, the nuts are previously welded to the peripheral edge portion of the bolt holes 22a2 on the back side of the base member mounting member 22a. Further, the bolt hole 52d1 of the base member 50 and the bolt hole 22a4 of the base member mounting member 22a are aligned, and these are fastened and fixed by bolts and nuts. Meanwhile, the nuts are previously welded to the peripheral edge portion of the bolt hole 22a4 on the back side of the base member mounting member 22a. In this state, cloth-like pulling members 20C1 provided in the back cover 20C on both left and right sides of the front surface portion 41 of the main back pad 40 are pulled rearward as necessary and are locked to the cover locking wire 25 of the back frame 20F. In this way, the main back pad 40 can be more stably attached to the back frame 20F. In this state, the rear surface portion 42 of the main back pad 40 and the left and right connecting portions 43 are supported by the base member 50 from the back side on the inner side of the seat, and the upper end side of the front surface portion 41 of the main back pad 40 is not supported by the base member 50.

The embodiment configured as described above has the following operational effects. The open annular base member 50, which is harder than the main back pad 40 and whose front surface portion is opened, is disposed on the annular portion 46 of the main back pad 40. With this configuration, the annular portion 46 including, particularly, a shoulder portion which needs to be shaped, can be shaped, so that the external appearance can be improved. Further, since the base member 50 does not affect the front surface portion 41 of the main back pad 40, the deterioration of the sitting comfort due to the discontinuity of the cushion feeling can be suppressed.

Further, the base member 50 is attached to the main back pad 40 by adhesion and is attached to the back frame 20F. Therefore, in the annular portion 46 of the main back pad 40, a gap between the peripheral edge portion of the opening portion 44 and the headrest 70 is maintained at a predetermine value, so that the deterioration of the external appearance can be suppressed. Furthermore, the lever 57a for controlling the movement of the seat back 20 is attached to the rear wall portion 52 of the base member 50. Therefore, the base member 50 can function not only as a member for shaping the main back pad 40 but also as an attachment portion of the lever 57a.

Although specific embodiments have been described above, the disclosure is not limited to these appearances and configurations, and various modifications, additions and deletions can be made without changing the spirit of the disclosure. For example, the following can be exemplified.

1. In the above embodiment, the main body part 51 of the base member 50 is made of polypropylene resin. However, the disclosure is not limited thereto. For example, the main body part 51 may be made of another resin, wood or metal, as long as it is harder than the main back pad 40.

2. In the above embodiment, the disclosure is applied to an automobile seat. However, the disclosure may be applied to a seat to be mounted on a vehicle such as an airplane, a ship or a train.

The disclosure provides illustrative, non-limiting examples as follows:

According to a first aspect, there is provided a vehicle seat including a seat back, the seat back including: a back frame serving as a framework; a top plate main seat pad that is a covered cushion member attached to the back frame and serving as a support structure at the center in a seat width direction; a top plate side seat pad that is a covered cushion member attached to the back frame and serving as support structures on both sides in the seat width direction; and a headrest, wherein the top plate main seat pad includes, at its upper portion, an annular portion having an opening portion in which the headrest is inserted and placed, and an open annular base member, which is harder than the top plate main seat pad and whose front surface portion is opened, is disposed on a surface of the annular portion at an inner side of the seat.

According to the first aspect, the open annular base member, which is harder than the top plate main seat pad and whose front surface portion is opened, is disposed on the annular portion of the top plate main seat pad. With this configuration, the annular portion including, particularly, a shoulder portion which needs to be shaped, can be shaped, so that the external appearance can be improved. Further, since the base member does not affect the front surface portion, the deterioration of the sitting comfort due to the discontinuity of the cushion feeling can be suppressed.

According to a second aspect, there is provided the vehicle seat according to the first aspect, wherein the top plate main seat pad is attached to the back frame by at least the base member being attached to the back frame.

According to the second aspect, the annular portion of the top plate main seat pad is attached to the back frame by the base member. Therefore, a gap between a peripheral edge portion of the opening portion and the headrest is maintained at a predetermine value, so that the deterioration of the external appearance can be suppressed.

According to a third aspect, there is provided the vehicle seat according to the second aspect, wherein an operating lever configured to control the movement of the seat back is attached to a rear surface portion of the base member.

According to the third aspect, the base member can function not only as a member for shaping the top plate main seat pad but also as an attachment portion of the operating lever.

What is claimed is:

1. A vehicle seat comprising a seat back, the seat back including:
a back frame serving as a framework;
a top plate main seat pad that is a covered cushion member attached to the back frame and serving as a support structure at the center in a seat width direction;
a top plate side seat pad that is a covered cushion member attached to the back frame and serving as support structures on both sides in the seat width direction; and
a headrest, wherein the top plate main seat pad includes an upper portion with an annular portion having an opening portion in which the headrest is inserted and placed, and the seat back further includes an open annular base member, which is harder than the top plate main seat pad and whose front surface portion is opened, is disposed on a surface of the annular portion at an inner side of the seat, wherein the top plate main seat pad and the top plate side seat pad are separate elements from one another, wherein the back frame includes an upper frame, and wherein both the top plate main seat pad and the top plate side seat pad covers an upper surface of the upper frame from an upper side.

2. The vehicle seat according to claim 1, wherein the top plate main seat pad is attached to the back frame by at least the base member being attached to the back frame.

3. The vehicle seat according to claim 2, wherein an operating lever configured to control a movement of the seat back is attached to a rear surface portion of the base member.

4. The vehicle seat according to claim 3, wherein the operating lever passes through the top plate main seat pad.

* * * * *